Feb. 16, 1960 R. L. MURRAY ET AL 2,925,232
AIRPLANE SPOILER ASSEMBLY
Filed June 5, 1957 2 Sheets-Sheet 1
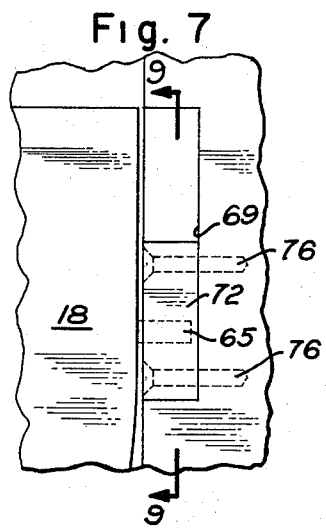
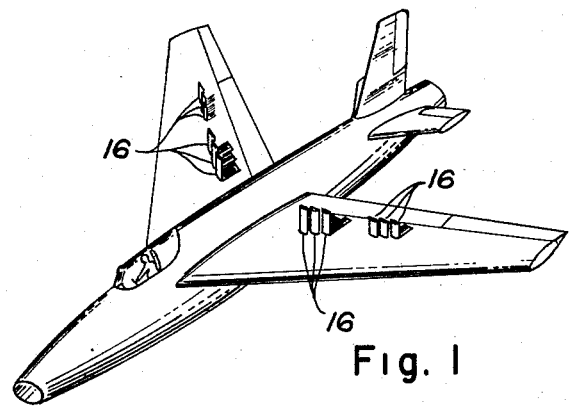
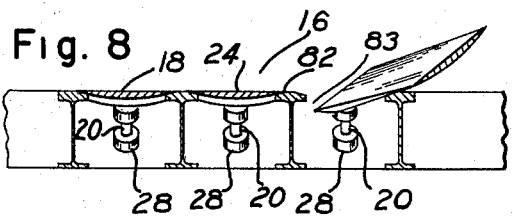
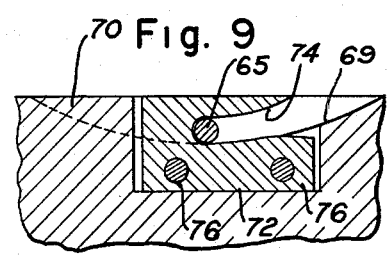
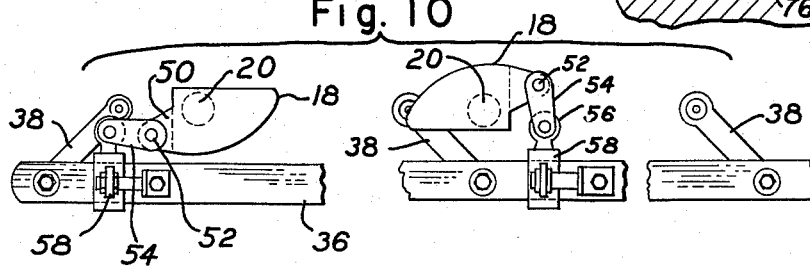
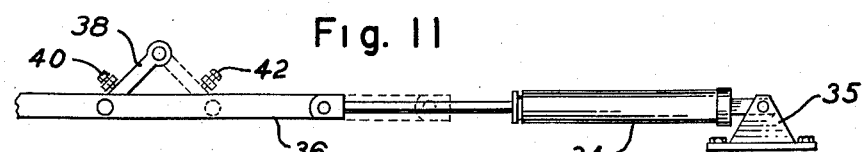
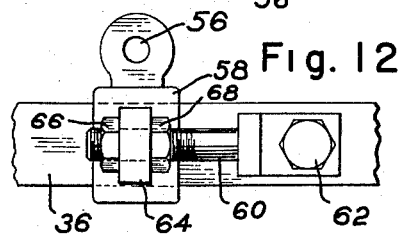
INVENTOR.
Richard L. Murray
Joseph A. Phillips
BY
Duane C. Bowen

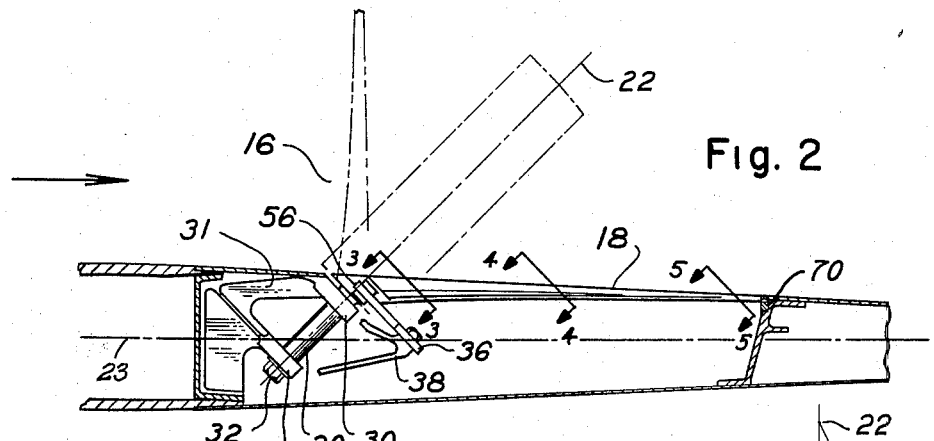
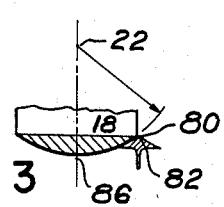
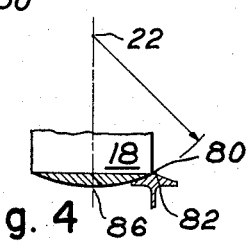
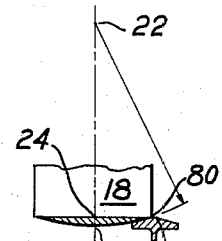
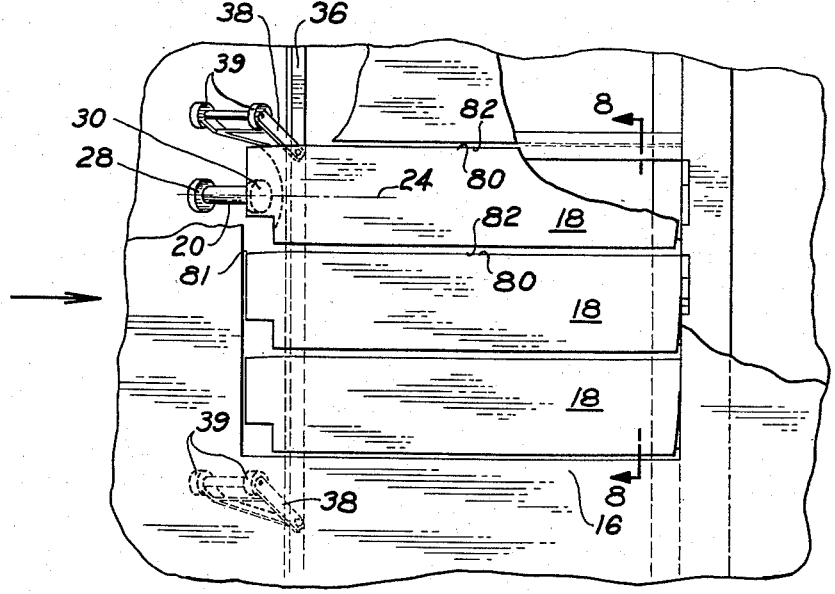

United States Patent Office 2,925,232
Patented Feb. 16, 1960

2,925,232
AIRPLANE SPOILER ASSEMBLY

Richard L. Murray and Joseph A. Phillips, Wichita, Kans., assignors to Boeing Airplane Company, Wichita, Kans., a corporation of Delaware Application June 5, 1957, Serial No. 663,837

8 Claims. (Cl. 244—42)

Our invention relates to an improved spoiler assembly for aircraft. The design is particularly advantageous for high speed wings. The spoiler blades are supported on axes that extend downwardly and forwardly at an acute angle to the wing chord and are raised by pivoting movement about the axes. This type of support is adapted for thin wing sections and high air loading.

In advanced aircraft design for higher speeds, the wings tend to become thinner and create a problem in housing control surfaces and their operating mechanisms. At the same time, the control surfaces are subject to higher loadings. The spoilers commonly have been raised and lowered by a hinged movement about axes extending horizontally and substantially at right angles to the wing chord. This is not well adapted for thin wings because it is difficult to provide sufficient mechanical advantage in simple mechanisms such as cranks to raise the spoilers in the room provided in a thin wing. The actuating mechanism in such spoiler design acts against the full strength of the air stream.

The objects of our invention include, therefore: to provide an improved spoiler design; to devise a spoiler assembly particularly adapted to be housed in thin, high speed wings; to provide a spoiler design minimizing the forces resulting from the action of the air stream on the actuating mechanism; and, in-so-far as consistent with the above objectives, to provide an efficient, economical, simple, minimum weight structure.

Our invention will be best understood, together with additional objectives and advantages thereof, from a reading of the following description, read with reference to the drawings in which:

Figure 1 is a perspective view of an aircraft incorporating an embodiment of our new spoiler design;

Figure 2 is an enlarged cross section, taken substantially on a wing chord, and showing in dotted lines a partially and a fully raised position of a spoiler blade;

Figures 3, 4, and 5 are enlarged sectional views taken respectively on lines 3—3, 4—4, and 5—5 of Figure 2;

Figure 6 is a plan view with portions broken away to show hidden structure;

Figure 7 is an enlarged, fragmentary plan view of the rear end of the spoiler blades;

Figure 8 is a fragmentary cross section taken on line 8—8 of Figure 6, one spoiler being shown partially raised;

Figure 9 is a sectional view taken on line 9—9 of Figure 7;

Figures 10 and 11 are enlarged fragmentary views of portions of the actuating assembly; and Figure 12 is an enlarged fragmentary view of adjustment means in the actuating assembly.

Figure 1 shows a number of spoiler assemblies 16 mounted on the upper surfaces of the wings of an aircraft. The aircraft shown has swept-back wings and the spoilers have similar orientation. It will be understood that the spoilers are adaptable to straight wings and may be positioned in line or in other disposition. The spoilers are shown in groups of three but may be single or in other combinations.

Spoilers 16 have blades 18 and have pivot portions 20 at one end of the blades and extending at an acute angle therefrom. One important feature of the invention is that the pivotal axis 22 is disposed at an acute angle to the horizontal and vertical, being downwardly directed as it extends forward at an acute angle to the wing chord 23. As will be understood in the following description, this and associated structure adapts the spoiler and operating mechanism to be housed in a thin wing section. It should be observed that the plane which is common to pivot axis 22 and the longitudinal axis 24 of the spoiler may be at an angle to directly forward or may be aligned, as the functioning will be similar. Preferably, this plane is upright, e.g., the centerline of the spoiler is substantially on the line which would be formed if the pivot axis were projected vertically down on the wing surface. The pivotal axis is in the plane of symmetry of the blade. Although this is not necessarily the case, substantial deviations will result in unbalanced distribution of spoiler air loading.

Bearings 28, 30 for pivot portion 20 are supported by structural members 31 which are secured to the structural members of the wing. Pivot portion 20 is secured in the bearings by a nut 32.

The drawings show common actuation means for each group of spoilers which includes a hydraulic piston and cylinder 34 supported by a bracket 35 and driving a common bar 36. Bar 36 is supported by pivotal arms 38 which have bearings 39 supported by the wing structure. In Figure 10, arms 38 on the left and right are shown in opposite positions for purposes of illustrating opposite positions in the actuation of operating bar 36. Stops for the movement of bar 36 may take the form of abutments 40, 42 acting on one of the arms 38 and adjustable by threaded means.

Blades 18 each have a boss 50 having a pivotal connection 52 to a link 54. Link 54 has a pivotal connection at 56 to a fitting 58 on control bar 36. Fitting 58 is adjustable longitudinally of bar 36 by means including a bolt 60 secured to bar 36 by bolt means 62 and having a threaded end extending through a lug 64 on fitting 58. Nuts 66, 68 on the opposite sides of lug 64 provide means for adjusting the position of the fitting longitudinally of the bar. Particularly in a high speed wing, it is imperative that the spoilers in retracted position fair into the surrounding airfoil surfaces. The adjusting means of Figure 12 permits independent positioning of each blade 18 so that all of the blades will be in proper position when bar 36 is moved to the down position.

Figures 7 and 9 show means to hold down the ends of the spoilers in down position to prevent displacement of the unsupported end. This takes the form of the pin 65 on each spoiler 18, an arcuate recess 69 in the adjacent wing structural member 70, and a fitting 72 having a slot 74 receiving pin 65 and secured by screws 76. Slot 74 is arcuate relative the pivotal axis when viewed in a plane normal to the axis.

Blades 18 fit in recesses, as 83, in the wing. The edges, as 80, of blades 18 should be positioned closely adjacent to the contiguous edge 82 of the wing surface. At the same time, edge 82 must be cleared as the spoiler blades are pivoted to up position. This is achieved by having the distance, from the pivotal axis 22 to all points, as 86, on the lower surface of the spoiler no greater than the distance from pivotal axis 22 to the edge 80 which is leading as the blade is raised, in planes normal to pivotal axis 22. This is illustrated in Figures 3, 4, and 5 in which lines 3—3, 4—4, and 5—5 are normal to the pivotal axis. In this way, edge 82 must be cleared as blade 18 is pivoted about the axis 22. The edges at the inner ends of the spoiler blades, as at 81, are modified because the pivotal axis is below the plane of the wing surface, e.g., the cross-section normal to the axis can be an arc of a circle greater than 180° having its center on the axis.

The only force required to raise the spoilers is a hinge moment about axis 22. The cross sections of spoiler 18, as demonstrated in Figures 3, 4 and 5, are preferably substantially symmetrical regarding a plane passing through pivot axis 22 and longitudinal axis 24. Since fluid pressure only can act normal to a surface, the fluid pressure on the essentially arcuate lower surface of blades 18 will tend to be balanced about axis 22 and the force is taken by bearings 28, 30. If the center of the arcs of the lower surface were on the pivotal axis, complete balancing of pressures on the lower arcuate surface would be achieved, but this ideal condition need be only approximated, e.g., the centers of the arcs may be spaced from the pivotal axis. Because of the symmetry and the arcuate surfaces, the pressures will be largely balanced about the axis in any case and the principal torque imposed on the pivotal axis 22 will be that created by the skin friction across the surface of the spoiler. Since this skin friction is relatively small, minimum power is required to raise the spoiler, particularly when compared with the previous spoiler constructions in which the spoilers were raised by simple hinge actions and in which the action of the air stream was substantially completely opposed to the adjusting mechanism.

If the center line of the spoiler in down position extends directly rearwardly, approximately 180° travel is required to up position. The angular travel is reduced if this line is canted relative the free air stream, and this disposition may be preferred in some installations in achieving more rapid movement from down to up position. Two important features are the positioning of the pivotal axis in the plane of symmetry of the spoiler blade and locating the axis so that the spoiler is movable between a down position in which one side of the blade serves as a wing surface to an up position in which the forward blade face is generally normal to the wing surface and to the free air stream. The spoilers are most effective in this disposition. The air stream is indicated by arrows in Figures 2 and 6.

Having thus described our invention, we do not wish to be understood as limiting ourselves to the precise details of construction shown, but instead wish to cover those modifications thereof which will occur to those skilled in the art from our disclosure and which fairly fall within the scope of our invention, as described in the following claims.

We claim:

1. A spoiler assembly mounted in an aircraft wing, comprising: a plurality of spoilers each having a blade and a pivot portion extending from one end of the blade at an acute angle to the blade longitudinal axis, bearing means secured to the wing and pivotally supporting said pivot portion for pivoting of said blade about a pivotal axis extending at an acute angle to the wing chord, the blade being pivotal between a down position and an up position in which the blade extends generally normally to the adjacent wing surface and to the free air stream, said wing having a recess receiving each spoiler blade in down position with the upper surface of the blade substantially flush with the adjacent wing surfaces, said pivotal axis being substantially in the plane of symmetry of the blade and the plane of symmetry being substantially normal to the adjacent wing surfaces in said blade down position, the major portion of the side edges of said blade being substantially parallel and the edges of said recess being contiguous to said blade side edges in said blade down position, the lower surface of the blade in down position being transversely convexly arcuate, and operating means operative to pivot said spoilers between up and down position.

2. A spoiler assembly mounted in an aircraft wing, comprising: a spoiler having a blade and pivotal support means for said blade supporting said blade secured to the wing and for pivoting about a pivotal axis extending at an acute angle to the wing chord, the blade being pivotal between a down position and an up position in which the blade extends outwardly from the adjacent wing surface in position to obstruct the free air stream, said wing having a recess receiving said spoiler blade in down position with the upper surface of the blade generally fairing into the adjacent wing surfaces, said pivotal axis being substantially in the plane of symmetry of the blade and the plane of symmetry being substantially normal to the adjacent wing surfaces in said blade down position, the major portion of the side edges of said blade and the edges of said recess being contiguous in the blade down position, and operating means operative to pivot said spoiler between up and down position.

3. The subject matter of claim 1 in which there is locking means acting between the outer end of each blade and the adjacent end portion of the associated recess locking the outer blade end in position flush with the adjacent wing surfaces against upward movement other than along the pivotal path of the blade.

4. The subject matter of claim 3 in which said locking means includes means forming a slot in said end portion of said recess which is arcuate relative the pivotal axis in a plane normal to said axis and which is open at the end corresponding to the pivotal path of said blade and means on said blade disposed to be received in said slot as the blade moves to down position.

5. A spoiler assembly mounted in an aircraft wing, comprising: a plurality of spoilers each having a blade and a pivot portion extending from one end of the blade at an acute angle to the blade longitudinal axis, bearing means secured to the wing and pivotally supporting said pivot portion for pivoting of said blade about a pivotal axis extending at an acute angle to the wing chord, the blade being pivotal between a down position and an up position in which the blade extends outwardly from the adjacent wing surface in position to obstruct the free air stream, said wing having a recess receiving each spoiler blade in down position with the upper surface of the blade substantially flush with the adjacent wing surfaces, said pivotal axis being substantially in the plane of symmetry of the blade and the plane of symmetry being substantially normal to the adjacent wing surfaces in said blade down position, and operating means operative to pivot said spoilers between up and down position.

6. The subject matter of claim 5 in which said operating means includes a pivotal connection to each spoiler outside of the pivotal axis and common drive means for said plurality of spoilers acting on said pivotal connections to pivot the spoilers and including independent adjustment means for orienting each blade in flush position relative the adjacent wing surfaces in the down position of said common drive means.

7. A spoiler assembly mounted in an aircraft wing, comprising: a spoiler having a blade and pivotal support means for said blade secured to said wing and supporting said blade for pivoting about a pivotal axis extending at an acute angle to the wing chord, the blade being pivotal between a down position and an up position in which the blade extends outwardly from the adjacent wing surface in position to obstruct the free air stream, said wing having a recess receiving said spoiler blade in down position with the upper surface of the blade generally fairing into the adjacent wing surfaces, the major portion of the side edges of said blade and the edges of said recess being contiguous in said blade down position, and operating means operative to pivot said spoiler between up and down position.

8. The subject matter of claim 7 in which there are a plurality of said spoilers positioned side-by-side and said operating means including common drive means for said spoilers for moving said blades between down and up position and including independent adjustment means for orienting each blade in flush position relative the adjacent wing surfaces in the down position of said common drive means.

References Cited in the file of this patent

UNITED STATES PATENTS

| | | |
|---|---|---|
| 2,041,688 | Barnhart | May 26, 1936 |
| 2,164,531 | Lee | July 4, 1939 |
| 2,210,935 | Giliberty | Aug. 13, 1940 |